Patented July 2, 1935

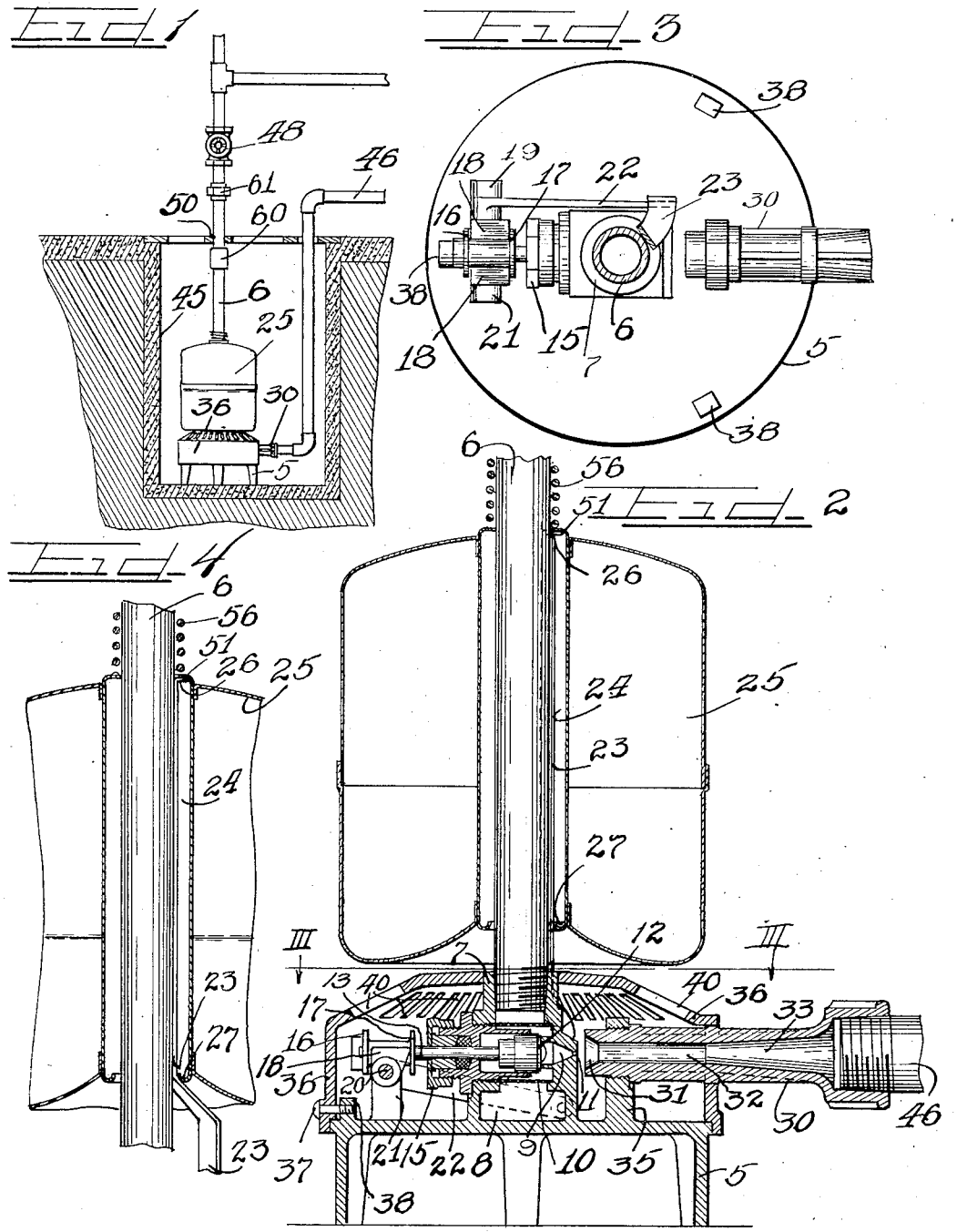

2,006,615

UNITED STATES PATENT OFFICE 2,006,615

CELLAR DRAINER

Howard D. Yoder, Detroit, Mich., assignor to Penberthy Injector Company, Detroit, Mich., a corporation of Michigan Application August 7, 1933, Serial No. 683,966

5 Claims. (Cl. 103—276)

This invention relates to an improved cellar drainer of the ejector type. Its function is to raise water from basements, sumps, elevators, coal and scale pits, and similar places to a higher level where it can be disposed of through a sewer or other drain.

Prior devices of this general type have had the disadvantage of being less compact and much more apt to get out of order on account of various exposed moving parts which were apt to become clogged by floating particles or other dirt in the drainage water. It has been the practice to construct such devices in four separate units, the strainer, ejector valve, and float, besides the various pipes, levers, etc., essential to a proper cooperation between these parts.

In order to prevent dirt, etc., clogging up the valves or interfering with the operation of the moving parts, it has been customary to place the moving parts above the water level. However, this presents the difficulty that there is a greater liability to freeze, and besides the construction makes the total height of the device very great, so that it cannot be used in a small sump.

I have now reduced this mechanism to one compact unit which may be operated in much smaller space than the ones previously made, and which overcomes the difficulties described above.

It is, then, an object of this invention to provide a cellar drainer which is more efficient and more compact than those now in use.

It is a further object of this invention to provide a drainer which has the principal moving parts protected from entanglement with foreign matter.

Further objects of this invention will become obvious from the following specification and the accompanying claims.

As shown on the drawing:

Figure 1 represents a side elevational view of my device installed in a sump, with the sump shown in section.

Figure 2 represents a vertical section of my device.

Figure 3 represents a section taken along the line III—III of Figure 2, with cover portion 36 of the strainer removed.

Figure 4 is a vertical section of the float of my device, with parts shown in elevation.

On the drawing:

My apparatus comprises generally three parts, a strainer 36, a float 25 which is guided by a pipe 6, and an ejector mechanism within said strainer to be described hereinafter. The pipe 6 extends upwardly from the central portion of the strainer 36 and connects with any suitable source of water supply under pressure to operate the ejector mechanism. A discharge pipe 46 also extends upwardly from the ejector mechanism and connects to any suitable drain.

The entire apparatus is mounted on a base 5 which comprises a flat portion supported by legs, said flat portion having a number of posts or projections 7, 19, 21, 35 and 38 for supporting the various operative parts mounted thereon.

The pipe 6 is connected with a hollow upright portion 7 cast integral with the base 5. An orifice 11 extends through one side of the portion 7 and opens into a conical space 9. The space 9 is normally shut off from the interior 8 of portion 7 by a valve mechanism which will now be described.

The portion 7 is provided with a large horizontal bore into which is placed a cylindrical screen or pressure strainer 10 and a packing gland assembly 15. The packing gland assembly supports a plunger 13 and a disc holder 12. The disc holder 12 is adapted to seat tightly against the opening of the conical space 9, thereby preventing communication between the spaces 8 and 9. This prevents water entering through the pipe 6 from passing through the orifice 11 when the disc holder 12 is properly seated.

The position of disc holder 12 is controlled by the float 25. The connection between the float and the disc holder will now be described.

The plunger 13 which carries disc holder 12 extends through the packing gland 15 and carries two collars 16 and 17 between which a cam 18 is mounted on a horizontal shaft 20. The shaft 20 is supported by bearings 19 and 21 which may be cast integral with the base 5. A lever 22 is mounted near one end of the shaft 20 and is connected to a bar 23 which extends upwardly into a chamber 24 within the float 25. When the float 25 rises due to an accumulation of water around the apparatus, a flange 27 at the lower end of the chamber 24 contacts with a projection 26 on the upper end of the bar 23, forcing said bar upwardly. This movement of the bar 23 causes an upward movement of the lever 22 and a rotation of the shaft 20 and the cam 18. The cam 18 then contacts with the collar 16, forcing the disc holder 12 away from the space 9, thus allowing water within space 8 to enter space 9 and discharge through the orifice 11. An ejector casing 30 is placed adjacent the orifice 11. This casing 30 contains an axial opening which comprises the conical portion 31, the cylindrical portion 32 and the enlarged portion 33.

In use, the entire apparatus is installed in a sump, as at 45, and the action just described takes place when the sump has filled with water. The stream of water from orifice 11 enters the conical opening 31 of the ejector casing 30 and the decrease in pressure resulting from the motion of said stream causes a rush of water into the casing 30 and out through the discharge pipe 46 connected thereto.

This action results in a gradual lowering of the water level in the sump 45 and a settling of the float 25 until the flange 51 contacts with the projection 26. This forces the bar 23 downwardly, thus causing a rotation of the shaft 20 and the cam 18 which forces the disc holder 12 against the opening 9, thus closing said opening and stopping the ejector action. As soon as sufficient water has again accumulated in sump 45, the above described cycle is repeated.

In case my device is used on high water pressure, I prefer to place a coil spring 56 on the pipe 6 above the float 25 to lessen any shock or jar which might occur from the float contacting with a pipe bushing 60 placed at a predetermined height controlled by the length of the pipe 6. A valve 48 and a union 61 are provided in the pipe 6 for convenience in cleaning or repairing my device.

One of the great advantages of this device over previous structures is the incorporation of the valve mechanism within the strainer 36. A strainer has been necessary in previous devices, and since the valve was not incorporated within it, it was necessary to use additional space above the strainer for the valve, and this has always resulted in a much less compact and higher structure than my present invention.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A cellar drainer comprising a strainer, an ejector and a valve mounted therein and controlling the pressure supply to said ejector, a float controlling the operation of said valve and provided with a vertically extending central opening and with spaced projections extending into said opening; a bar lever connected to said valve and extending upwardly into said opening, said bar having a member near the upper end thereof adapted to contact with one of said spaced projections to close said valve when said float is lowered, and adapted to contact with the other of said projections when said float is raised to open said valve.

2. In a cellar drainer including a base providing a strainer, a pipe extending upwardly from said base and a float movable along said pipe as a guide and spaced therefrom, means within said strainer for evacuating water therefrom comprising an ejector, a valve controlling the discharge through said ejector from said pipe, a cam device, a vertical bar associated with said cam device for controlling said valve, said bar extending into the space between said float and said pipe, a projection on said bar, and flanges on said float at the top and bottom thereof adapted to contact said projection as said float is raised or lowered, thereby imparting motion to said bar and said cam and operating said valve.

3. In a cellar drainer including a base providing a suction strainer cage, a pipe extending upwardly from said cage, means within said cage for evacuating water therefrom, said means including an ejector extending horizontally into said cage between the top and bottom thereof, a horizontally movable valve within said cage for controlling discharge through said ejector from said pipe, a cam device within said cage for actuating said valve, a float movable along said pipe as a guide and spaced from said pipe, a bar extending into the space between said pipe and float, a projection on said bar, and vertically spaced lugs on said float adapted to contact said projection as said float is raised or lowered thereby imparting motion to said bar, and connections between said bar and said cam device for actuating said valve in accordance with the bar movements.

4. In a cellar drainer, in combination, a suction strainer cage, means providing a chamber within said cage, said means having an opening through a side thereof constituting a discharge orifice into said cage, the interior of said chamber being otherwise out of communication with said cage, an ejector casing extending into said cage and disposed with its receiving end in proximity to said orifice, a valve movable within said chamber for controlling discharge through said orifice, a cam device within said cage and operably connected to said valve to reciprocate it, a vertically disposed supply pipe communicating with said chamber, a float movable along said pipe as a guide, and connections between said float and said cam device to operate said valve as said float is raised or lowered.

5. In a cellar drainer, means for controlling fluid flow therethrough, said means including in combination, a movable flow control member, a float controlling the operation of said member and provided with a vertically extending central opening and with spaced projections extending into said opening, and a bar lever operatively connected to said member and extending into said opening, said bar lever having a part adapted to contact one of said spaced projections to move said member in a direction to stop fluid flow through said drainer when said float is moved in one direction and adapted to contact with the other of said projections when said float is moved in the opposite direction to permit fluid flow through said drainer, the engagement of said bar part with the float projections occurring within the height of the float to protect such engagement against interference by foreign matter.

HOWARD D. YODER.